M. F. WILLIAMS.
JOURNAL BOX FOR ROTARY MILLS.
APPLICATION FILED FEB. 2, 1914.
1,111,342.
Patented Sept. 22, 1914.
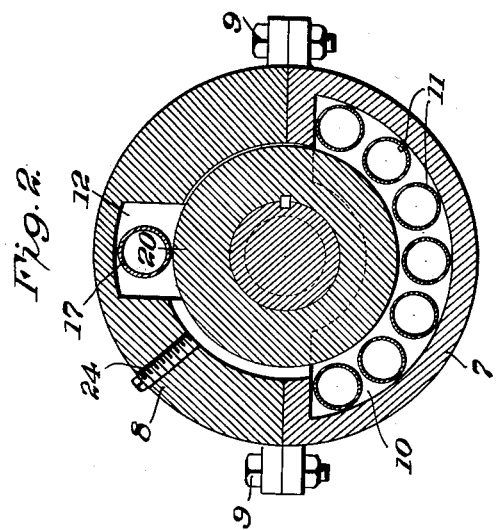
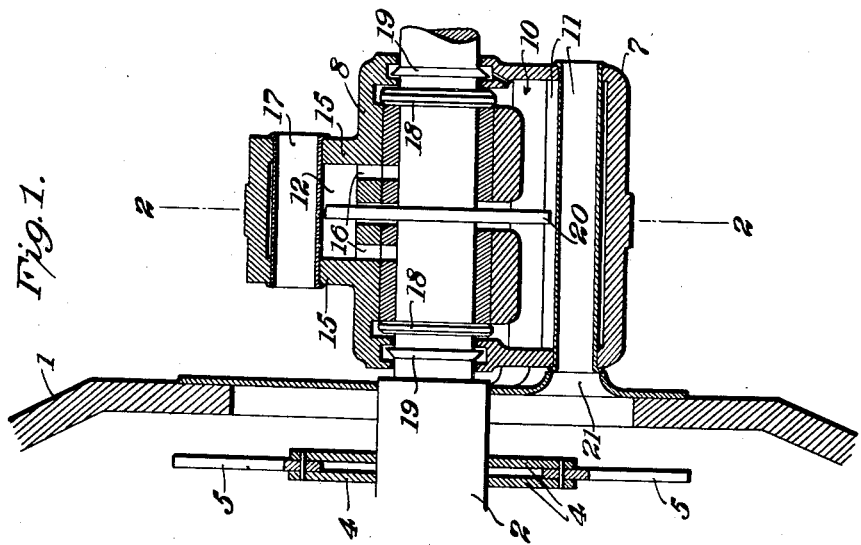
Witnesses:
J. Adolph Bishop
C. S. Butler
Inventor:
Milton F. Williams,
By J. W. Conway
Atty.

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

JOURNAL-BOX FOR ROTARY MILLS.

1,111,342.     Specification of Letters Patent.     Patented Sept. 22, 1914.

Application filed February 2, 1914. Serial No. 816,017.

*To all whom it may concern:*

Be it known that I, MILTON F. WILLIAMS, a citizen of the United States, residing in city of St. Louis, State of Missouri, have invented a certain new and useful Improvement in Journal-Boxes for Rotary Mills, of which the following is a full, clear, and exact description, such as will enable others skilled in the art to which it appertains to make and use the same, reference being had to the accompanying drawings, forming part of this specification, in which—

Figure 1 is an elevational section showing a portion of a rotary mill equipped with my improved journal box. Fig. 2 is a section taken substantially on line 2—2 of Fig. 1.

My invention relates broadly to journal boxes, and specifically to a form of self lubricating journal of special design for a rotary mill and provided with features whereby the lubricant is cooled by a circulation of air induced by operation of the mill.

It will be understood that this journal box is designed for use on a mill of rotary hammer type wherein is employed a series of hammers or beaters which are supported on a shaft, and designed, upon rotation of the shaft, to coöperate with a concave or grinding cage for the purpose of reducing material fed into the mill.

The object of my invention is to produce a simple form of self lubricating journal wherein the bearings are completely inclosed so as to protect them from the dust which is so prevalent in and about mills of this type.

A further object is to provide an efficient means for cooling the lubricant and for supplying it constantly to the bearings while the mill is in operation.

As illustrated in Fig. 1, the reference numeral 1 represents the casing of the mill, 2 the rotary shaft extending therethrough, 4 hammer supports carried on the shaft, and 5 hammers pivotally mounted on the supports 4.

Shaft 2 is equipped with a suitable pulley or other power transmission means by which it is designed to be rotated at a high rate of speed. On a suitable bracket 6 mounted on the casing or the base of the machine, is supported the lower section 7 of the journal box. The upper section 8 of the journal box is secured to the lower section 7 by suitable fastenings 9. The lower section 7 is provided with the chamber 10 constituting an oil well for holding the lubricant. Extending through this chamber is a series of tubes 11 secured at their ends in the walls of the lower section 7. The upper section is provided with a centrally disposed chamber 12 above the shaft which is carried on bearings 14 supported on the bearing supports 15 formed on the casing. Oil channels 16 lead from chamber 12 to the shaft for the purpose of conducting oil from said chamber to the bearings. Through chamber 12 extends the tube 17 similar to the tubes 11. The shaft 2 is provided with the usual thrust collars 18 designed to prevent longitudinal movement of the shaft relative to the bearings, and the guard collars 19 designed to prevent the egress of lubricant along the shaft or the ingress of foreign matter. Intermediate the bearing supports 15, a disk 20 is carried by the shaft 2 and keyed thereto so as to rotate therewith. The machine casing 1 is provided with a series of apertures 21 disposed in the axial portion of the casing and arranged so as to register with the tubes 11.

It will be understood that in the operation of a mill of this type, the rapid rotation of the beaters or hammers 5 produces a circulation of air similar to that produced by a centrifugal fan, which action is to impel air outwardly from the shaft, drawing it in about the axis of rotation, which is commonly called the eye of the fan.

The chamber 10 being filled to the proper level with lubricant, which may be introduced by means of a gun through the tap 24, the rotation of shaft 2 in the operation of the mill causes the disk 20, the lower portion of which travels through the lubricant in chamber 10, to carry a portion of the lubricant upward and throw it off by the centrifugal action into the chamber 12. The lubricant thus thrown off impinges upon the tube 17 and the walls of the chamber 10, and runs down the latter and through the channels 16 to the bearings. The rotation of the beaters 5 with shaft 2, by virtue of the fan action above described, draws a constant current of air through the tubes 11 and the orifices 21 into the eye of the machine. This constant current of air through the tubes 11 acts to carry off the heat therefrom, thereby cooling the lubricant in chamber 10 about the tubes. The tube 17 permits a certain amount of air circulation therethrough which acts to cool the lubricant thrown thereon by the disk 20.

From the foregoing it is obvious that this device during the operation of the mill, affords a constant supply of lubricant to the bearings, and produces a constant circulation of air through radiating members disposed in the oil well, said circulation of air being induced by the operation of the machine. Furthermore, it is obvious that this device provides an efficient self-lubricating journal which completely incloses the bearings and thus protects them from foreign matter.

Although I have shown the preferred form of my invention, I am aware that various changes and modifications may be made therein without departing from the spirit thereof. Therefore, I do not intend that my invention be construed as limited to the specific form shown.

What I claim is:

1. In a mill including a casing, a shaft, and elements rotated within said casing by said shaft, a journal box provided with an oil chamber, bearings for said shaft, lubricant distributing means operating in said chamber and operated by said shaft, and hollow radiating members extending through said chamber, an opening exteriorly of the journal box, said casing being provided with apertures in its axial portion, which apertures register with said hollow radiating members for the purpose described.

2. In combination, a machine casing, a shaft, a journal box carrying bearings for said shaft, said journal box being provided with an oil chamber, said journal box being provided with radiating members extending through said oil chamber and open to the atmosphere at their ends, and means operated by said shaft within said casing adapted to induce a circulation of air in said radiating members.

3. In a machine of the class described, a casing, a rotary shaft, a journal box providing bearings for said shaft, said journal box being provided with an oil chamber, said shaft being provided with oil distributing means, tubes extending through said oil chamber and open to the atmosphere and communicating with the interior of said casing, and means operating within said casing adapted to draw air through said tubes.

4. In combination a rotary shaft, a rotary element operated thereby, and a casing inclosing said rotary element and provided with an axially disposed aperture, a journal box providing a bearing for said shaft and provided with an oil chamber, said journal box being provided with an air passage through said oil chamber and communicating with said aperture to permit the circulation of air through said passage by the operation of said rotary element.

In testimony whereof I hereunto affix my signature in the presence of two witnesses, this 19th day of January, 1914.

MILTON F. WILLIAMS.

Witnesses:
M. P. SMITH,
C. S. BUTLER.